United States Patent [19]

Sugiyama

[11] Patent Number: 4,484,454
[45] Date of Patent: Nov. 27, 1984

[54] AIR CONDITIONING APPARATUS
[75] Inventor: Akihiko Sugiyama, Fuji, Japan
[73] Assignee: Tokyo Shibaura Denki Kabushiki Kaisha, Kawasaki, Japan
[21] Appl. No.: 573,200
[22] Filed: Jan. 23, 1984
[30] Foreign Application Priority Data
   Jan. 25, 1983 [JP] Japan ................................. 58-10324
[51] Int. Cl.³ ............................................. F25B 41/04
[52] U.S. Cl. ........................................ 62/222; 62/160; 62/505
[58] Field of Search ....................... 62/505, 160, 228.4, 62/324.6, 222

[56] References Cited
U.S. PATENT DOCUMENTS 3,299,661  1/1967  Harnish et al. ..................... 62/324.6
4,262,492  4/1981  Morita et al. ....................... 62/324.6

FOREIGN PATENT DOCUMENTS 5019249  1/1973  Japan .
54-58242  5/1979  Japan ................................. 62/160

Primary Examiner—William E. Wayner
Assistant Examiner—J. Sollecito
Attorney, Agent, or Firm—Schwartz, Jeffery, Schwaab, Mack, Blumenthal & Koch

[57] ABSTRACT

In a heat pump type air conditioning apparatus of the type wherein a variable capacity type compressor is connected with a conduit including an outdoor heat exchanger, a first capillary tube and an indoor heat exchanger via a four way valve, there are provided a bridge circuit connected between the first capillary tube and the indoor heat exchanger, the bridge circuit being constituted by a first conduit including a first check valve permitting a flow of the refrigerant at the time of cooling and a second capillary tube, and a second conduit connected in parallel with the first conduit and including a second check valve permitting a flow of the refrigerant at the time of heating and a third capillary tube, and a bypass conduit including a controlled valve and connected between the first and second conduits, a cooling conduit for the compressor and connected to the control valve, and a control circuit for controlling the controlled valve in accordance with the temperature of the refrigerant discharged from the compressor, or with the frequency of the alternating current supplied to the driving motor of the compressor, or with the temperature and frequency.

6 Claims, 9 Drawing Figures

AIR CONDITIONING APPARATUS

BACKGROUND OF THE INVENTION

This invention relates to a heat pump type air conditioning apparatus of the heat pump type capable of operating as a cooler and a heater, and more particularly to an improvement of an air conditioning apparatus utilizing a variable capacity type compressor.

To have a better understanding of this invention a prior art air conditioning apparatus of this type will firstly be described with reference to FIG. 1 of the accompanying drawing.

The air conditioning apparatus shown in FIG. 1 comprises an outdoor heat exchanger 1, a capillary tube 2 acting as a refrigerant expansion member, an indoor heat exchanger 3 and a variable capacity compressor 5 driven by an inverter, not shown, generating single phase or polyphase alternating current of a variable frequency, which are interconnected through a four way valve 7 and conduits 4, 6, 17 and 4a. Between the capillary tube 2 and the conduit 4a is disposed a bridge circuit 8 including parallelly connected first conduit 9, a second conduit 10 and a bypass conduit 11 provided with a variable throttle valve 12, for example an automatic expansion valve 12. At the time of cooling the refrigerant is permitted to flow through the capillary tube 2, first conduit 9, bypass conduit 11, a check valve 16 in the second conduit 10 and indoor heat exchanger 3, whereas at the time of heating, the refrigerant is permitted to flow through the indoor heat exchanger 3, a check valve 14 of the first conduit 9, bypass conduit 11, a check valve 12, capillary tube 2, pairs of check valves 13, 14 and 15, 16 included in the first and second conduits 9 and 10 respectively. A compressor cooling conduit, for example a liquid refrigerant bypass conduit 17 is connected between a junction 4b between the capillary tube 2 and the bridge circuit 8 and the suction conduit 6a of the compressor 5. The liquid refrigerant bypass conduit 17 includes a capillary tube 18. The liquid refrigerant bypass conduit 17 can be substituted by a liquid injection conduit which injects low temperature liquid refrigerant into the compressor 5.

With the construction described above when the four way valve 7 is rotated to a position shown in FIG. 1, the refrigerant flows in a circuit shown by solid line arrows to effect cooling operation. The automatic expansion valve 12 in the bridge circuit 8 automatically changes its degree of opening so as to make the quantity of the circulating refrigerant to be proportional to the output of the compressor 5. More particularly, when the output of the compressor 5 is large the quantity of the circulating refrigerant is made large, whereas when the output of the compressor 5 is small, the quantity of the circulating refrigerant is made small.

In the prior art air conditioning apparatus described above, since the load of the compressor 5 is small when its output is small, the quantity of the liquid refrigerant supplied to the compressor through the bypass conduit 17 for cooling the same may be small. However, under this condition, as the degree of opening of the automatic expansion valve 12 is small, the quantity of the refrigerant supplied to the liquid refrigerant bypass conduit 17 increases proportionally. For this reason, the compressor 5 would be cooled excessively so that the refrigerant in the compressor 5 will dissolve into lubricant utilized to lubricate the moving or rotating parts of the compressor, thus decreasing the lubricating performance.

Furthermore, the automatic expansion valve 12 is expensive which increases the cost of the air conditioning apparatus.

SUMMARY OF THE INVENTION

Accordingly, it is an object of this invention to provide an improved heat pump type air conditioning apparatus capable of obviating the defects of the prior art apparatus and varying the quantity of the liquid refrigerant flowing through the compressor cooling conduit in accordance with the output of the compressor.

Another object of this invention is to provide a low price heat pump type air conditioning apparatus wherein a low price valve is substituted for an expensive automatic expansion valve.

Still another object of this invention is to provide a novel heat pump type air conditioning apparatus utilizing a valve so controlled by the temperature of the refrigerant discharged from the compressor and the frequency of alternating current supplied to the driving motor of the compressor that the compressor can operate satisfactory over a wide range of load variation.

According to this invention, there is provided heat pump type air conditioning apparatus of the type wherein a variable capacity type compressor is connected with a conduit including an outdoor heat exchanger, a first refrigerant expansion member and an indoor heat exchanger via a four way valve, characterized in that there are provided a bridge circuit connected between the first refrigerant expansion member and the indoor heat exchanger, the bridge circuit being constituted by a first conduit including a first check valve permitting a flow of the refrigerant at the time of cooling and a second refrigerant expansion member; a second conduit connected in parallel with the first conduit and including a second check valve permitting a flow of the refrigerant at the time of heating and a third refrigerant expansion member, and a bypass conduit including a controlled valve and connected between a junction between the first check valve and the second refrigerant expansion member of the first conduit, and another junction between the second check valve and third refrigerant expansion member of the second conduit; a cooling conduit for the compressor, the cooling conduit being connected to the another junction; and means for controlling the controlled valve in accordance with the temperature of the refrigerant discharged from the compressor, or with the frequency of the alternating current supplied to the driving motor of the compressor, or with both the temperature and frequency.

DESCRIPTION OF THE PREFERRED EMBODIMENT

Figure 1:
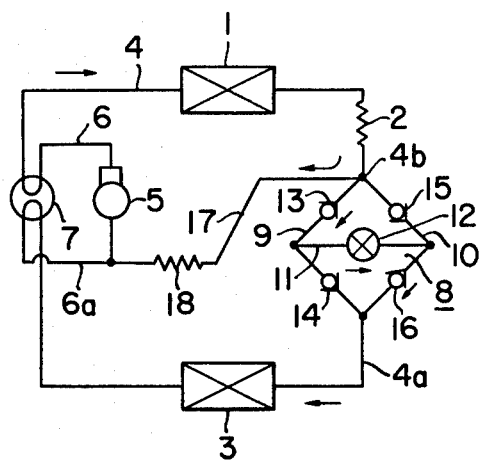
FIG. 1 is a connection diagram showing a prior art air conditioning apparatus.
Figure 2:
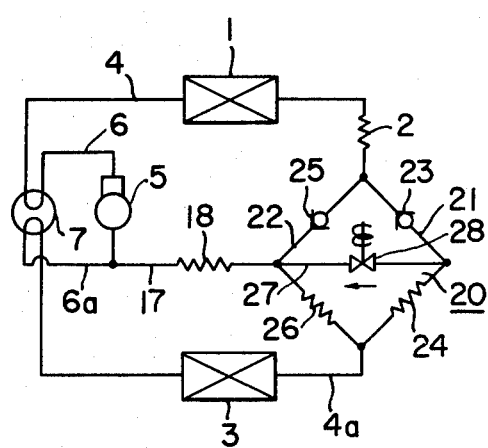
FIG. 2 is a connection diagram showing a preferred embodiment of this invention.

Referring now to FIG. 2 in which elements corresponding to those shown in FIG. 1 are designated by the same reference numerals. In this embodiment, a bridge circuit 20 connected between the capillary tube 2 and the indoor heat exchanger 3 comprises first and second conduits 20 and 21 which are connected in parallel. In the first conduit 21 are included a check valve 23 permitting the flow of the refrigerant at the time of cooling and an expansion member in the form of a capillary tube 24, whereas in the second conduit 22 are included a check valve 25 permitting the flow of the refrigerant at the time of heating and a capillary tube 26. The bridge circuit 20 is further provided with a bypass passage 27 connected between the junction between the check valve 23 and the capillary tube 24 of the first conduit 21 and the junction between the check valve 25 and the capillary tube 26 of the second conduit 22, and the bypass conduit 27 is provided with a controlled valve 28 in the form of an electromagnetic valve which interrupts or establishes communication between the first and second conduits 21 and 22. The controlled valve 28 is controlled in accordance with the frequency of the alternating current supplied to the compressor driving motor and/or the temperature of the refrigerant discharged from the compressor as will be described later.

Between the junction between the check valve 25 and the capillary tube 26 of the second conduit 22 and the compressor 5 is connected a liquid refrigerant bypass conduit 17 including a capillary tube 18. In the same manner as the prior art apparatus shown in FIG. 1, the liquid refrigerant bypass circuit 17 can be replaced with a liquid refrigerant injection conduit.

The embodiment shown in FIG. 2 operates as follows:

At the time of cooling, the refrigerant outputted from the compressor 5 passes through four way valve 7, outdoor heat exchanger 1, capillary tube 7, bridge circuit 20, and indoor heat exchanger 3 and then returns to the compressor 5. At this time, the liquid refrigerant undergoes heat exchange with room air while it passes through the indoor heat exchanger 3 thereby cooling indoor air.

During the cooling operation, when the output of the compressor 5 is high, the valve 28 in the bridge circuit 20 is opened, while during the low output operation, the valve 28 is closed. The flow of the refrigerant through the bridge circuit 20 under these conditions is as follows.

Figure 3A:
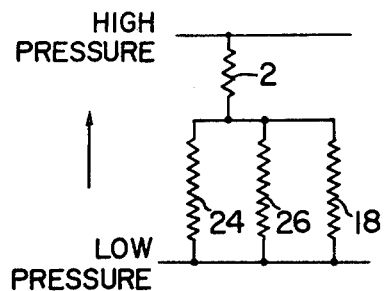
FIGS. 3A through 3D are diagrams showing pressure drop of refrigerant at various running conditions.

More particularly, when the valve 28 is opened for effecting the high output cooling operation, the refrigerant flows through the following two paths, one passing through the check valve 23 and the capillary tube 24 of the first conduit, and the other through the check valve 23, the valve 28 in the bypass conduit 27 and through the capillary tube 26 of the second conduit 22. A portion of the refrigerant passing through the valve 28 flows through the capillary tube 18 in the bypass conduit 17 to be converted into a low temperature, low pressure condition and then conveyed to the suction conduit 6a of compressor 5 for cooling the same. FIG. 3A shows the pressure reducing states of the refrigerant in respective capillary tubes 2, 24, 26 and 18. More particularly, the pressure is reduced to some extent in the capillary tube 2 in the main conduit 4 and then parallelly reduced in capillary tubes 24, 26 and 18 in the first conduit 21, the second conduit 22 and the liquid refrigerant bypass conduits 17 respectively.

Figure 3B:
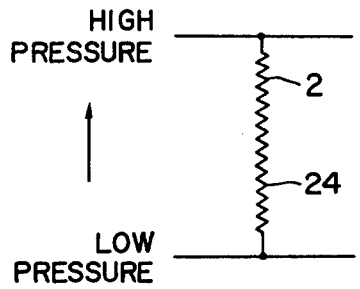

When the valve 28 is closed for effecting low output cooling operation, the refrigerant flows only through the check valve 23 and the capillary tube 24 of the first conduit 21. At this time, the refrigerant pressure at the inlet side of the capillary tube 18 in the liquid refrigerant bypass conduit 17 becomes substantially equal to that of the conduit 6a on the suction side of the compressor 5 so that any appreciable quantity of the liquid refrigerant does not flow through the liquid bypass passage 17 whereby the compressor 5 would not be cooled. Because, at this time, the compressor 5 is operated at a low output so that it is not necessary to cool it. Consequently, the pressure reduction state of the refrigerant is shown by FIG. 3B. In this case, the degree of throttling of liquid refrigerant would be larger than the aforementioned case of the high output running in which a portion of the liquid refrigerant flows through the bypass conduit 17, thus obtaining a degree of throttling commensulate with the running condition.

As above described, according to this invention since substantially no liquid refrigerant flows through the liquid bypass conduit 17 at the time of the low output cooling operation, the compressor 5 would not be cooled excessively, thus avoiding dissolving of the refrigerant into the lubricating oil in the compressor 5.

Then, at the time of heating, the refrigerant flows between the output side and the suction side of compressor 5 via a passage through four way valve 7, indoor heat exchanger 3, bridge circuit 20, capillary tube 2, outdoor heat exchanger 1 and conduit 6. While flowing through the indoor heat exchanger 3, the compressed gaseous refrigerant warms the air in the room through indoor heat exchanger 3.

In the same manner as in the case of cooling described above, at the time of the high output running, the valve 28 in the bridge circuit 20 is opened whereas it is closed at the time of low output running. The flow of the refrigerant in the bridge circuit 20 under these conditions is as follows.

Figure 3C:
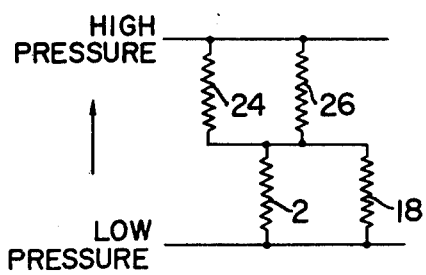

Thus, when the valve 28 is opened for effecting the high output heating running, a portion of the gaseous refrigerant flows through capillary tube 26 and check valve 25 of the second conduit 22 and the other portion flows through capillary tube 24 of the first conduit 21, valve 28 and check valve 25 of the second conduit 22. At this time, a portion of the refrigerant flowing through the second conduit 22 flows to the suction conduit 6a of the compressor 5 through capillary tube 18 in the bypass passage 17 to cool the compressor 5. The state of pressure reduction of the refrigerant at this time is shown by FIG. 3C. Thus, the pressure of the refrigerant decreases by some extent while it parallelly flows through capillary tubes 24 and 26 of both conduits 21 and 22 and then decreases further while parallelly flowing through capillary tubes 2 and 18 in the conduit 4 and the bypass conduit 17, respectively.

Figure 3D:
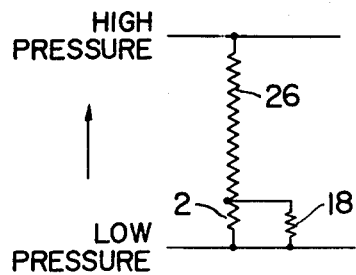

When valve 28 is closed for effecting low output heating operation, a portion of the refrigerant passed through capillary tube 26 of the second conduit 22 flows through check valve 25, while the other portion flows through bypass conduit 17. Different from the low output cooling operation, during this low output heating operation, although the quantity of the refrigerant flowing through the refrigerant bypass passage 17 becomes smaller than that of the high output heating operation but is not reduced to zero. For this reason, the compressor 5 is cooled to some extent. The pressure reduction state of the refrigerant at this time is shown in FIG. 3D. Thus, the pressure is substantially reduced by the capillary tube 26 of the second conduit 22 and then reduced further by parallelly connected capillary tubes 2 and 18 in the conduit 4 and the bypass conduit 17 respectively.

As above described, at the time of the low output heating operation, since the quantity of the refrigerant flowing through the liquid refrigerant bypass conduit 17 is small, the compressor 5 is cooled only a little but not excessively so that there is no fear of dissolving the refrigerant into the lubricant in the compressor 5.

In the foregoing embodiment, the refrigerant always flows through the valve 28 from right to the left whether the air conditioning apparatus operates as a heater or a cooler so that the valve 28 may be a one way electromagnetic valve of simple construction.

Figure 4:
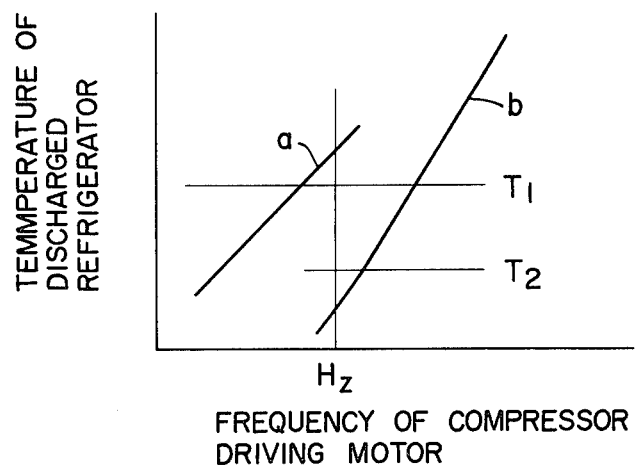
FIGS. 4 and 5 are graphs showing method of controlling a controlled valve.
Figure 5:
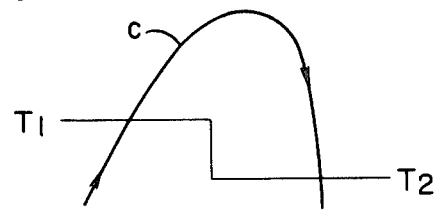
Figure 6:
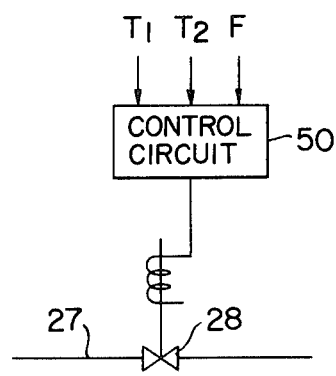
FIG. 6 is a block diagram showing one example of the control circuit for controlling the control valve.

As shown in FIG. 6 the valve 28 is controlled by a control circuit 50 responsive to the discharge temperatures $T_1$ and $T_2$ of the refrigerant from the compressor and the frequency F of the alternating current supplied to the drive motor of the compressor. This method of control will be described in detail with reference to FIGS. 4 and 5. Thus, as shown in FIG. 4, valve 28 is controlled in accordance with the frequency of the compressor driving motor such that a specific driving frequency Hz is set, that the valve 28 is closed as shown by curve a when the driving frequency decreases below the specific frequency Hz, and that as the driving frequency exceeds the specific frequency Hz, the valve 28 is opened as shown by curve b.

However, with this method of control in which the valve 28 is controlled only in accordance with the driving frequency there arise the following problems. More particularly, near the specific frequency Hz at which the valve 28 is operated, for example at a frequency slightly lower than the specific frequency Hz, the load of the compressor becomes large which causes an excessive superheat. On the other hand, at a frequency slightly above the specific frequency, the compressor load becomes too small causing reverse flow of the refrigerant.

To control the valve 28 in accordance with the temperature of the refrigerant discharged from the compressor 5 it is advantageous to set two specific or reference temperatures $T_1$ (high temperature) and $T_2$ (low temperature). Then, when the temperature of the discharged refrigerant rises as shown by curve c shown in FIG. 5, the valve 28 is opened when the temperature exceeds the set high temperature $T_1$, but as the temperature c of the discharged refrigerant decreases below the set low temperature $T_2$, the valve 28 is closed.

With the above described method of control of the valve 28 in accordance with the temperature of the discharged refrigerant, when the temperature of the discharged refrigerant rises, the valve 28 is held closed until the temperature c reaches $T_1$ so that the throttling becomes excessive thereby greatly impairing the performance of the compressor.

For this reason, it is advantageous to control valve 28 in accordance with the frequency of the compressor driving motor and two predetermined temperatures of the discharged refrigerant.

More particularly, in the control shown in FIG. 4 made in accordance with the frequency, even when valve 28 is held closed when the frequency of the compressor driving motor is below the specific or switching frequency Hz, as the temperature of the discharged refrigerant rises above the predetermined high temperature $T_1$ the valve 28 is opened and this condition is maintained until the temperature of the discharged refrigerant decreases below the predetermined low temperature $T_2$.

While the driving frequency is higher than the specific frequency Hz and the valve 28 is held open, when the temperature of the discharged refrigerant decreases below the predetermined low temperature $T_2$, the valve 28 is closed and this condition is maintained until the temperature of the discharged refrigerant exceeds the predetermined high temperature $T_1$.

Although depicted diagrammatically it should be understood that the control circuit 50 shown in FIG. 6 includes a suitable priority circuit effecting the control of the valve 28 just mentioned.

According to the method of controlling the valve 28 described above it is possible to obviate troubles caused by load variations near the switching frequency.

Where the range of the frequency of the compressor driving motor is narrow the valve 28 may be controlled according to either one of frequency and the temperature of the discharged refrigerant. Furthermore, during the defrosting operation, valve 28 is controlled by only the frequency.

As above described, according to this invention, since the quantity of refrigerant supplied to the compressor for cooling the same can be varied in accordance with the output of the compressor by controlling valve 28 connected across a bridge circuit, it is possible to prevent excessive cooling of the compressor thus preventing refrigerant from dissolving into the lubricant of the compressor. Moreover, the valve 28 utilized in this invention is a simple opening and closing type valve which is far cheaper than an automatic expansion valve.

I claim:

1. In heat pump type air conditioning apparatus of the type wherein a variable capacity type compressor is connected with a conduit including an outdoor heat exchanger, a first refrigerant expansion member and an indoor heat exchanger via a four way valve, the improvement which comprises:
    a bridge circuit connected between said first refrigerant expansion member and said indoor heat exchanger, said bridge circuit being constituted by a first conduit including a first check valve permitting a flow of the refrigerant at the time of cooling and a second refrigerant expansion member;
    a second conduit connected in parallel with said first conduit and including a second check valve permitting a flow of the refrigerant at the time of heating and a third refrigerant expansion member, and a bypass conduit including a controlled valve and connected between a junction between said first check valve and said second refrigerant expansion member of said first conduit, and another junction between said second check valve and said third refrigerant expansion member of said second conduit;
    a cooling conduit for said compressor, said cooling conduit being connected to said another junction; and
    means for controlling said controlled valve in accordance with a temperature of said refrigerant discharged from said compressor.

2. In heat pump type air conditioning apparatus of the type wherein a variable capacity type compressor is connected with a conduit including an outdoor heat exchanger, a first refrigerant expansion member and an indoor heat exchanger via a four way valve, the improvement which comprises:

- a bridge circuit connected between said first refrigerant expansion member and said indoor heat exchanger, said bridge circuit being constituted by a first conduit including a first check valve permitting a flow of the refrigerant at the time of cooling and a second refrigerant expansion member;
- a second conduit connected in parallel with said first conduit and including a second check valve permitting a flow of the refrigerant at the time of heating and a third refrigerant expansion member, and a bypass conduit including a controlled valve and connected between a junction between said first check valve and said second refrigerant expansion member of said first conduit, and another junction between said second check valve and said third refrigerant expansion member of said second conduit;
- a cooling conduit for said compressor, said cooling conduit being connected to said another junction; and
- means for controlling said valve in accordance with a frequency of alternating current supplied to a driving motor of said compressor.

3. In heat pump type air conditioning apparatus of the type wherein a variable capacity type compressor is connected with a conduit including an outdoor heat exchanger, a first refrigerant expansion member and an indoor heat exchanger via a four way valve, the improvement which comprises:

- a bridge circuit connected between said first refrigerant expansion member and said indoor heat exchanger, said bridge circuit being constituted by a first conduit including a first check valve permitting a flow of the refrigerant at the time of cooling and a second refrigerant expansion member;
- a second conduit connected in parallel with said first conduit and including a second check valve permitting a flow of the refrigerant at the time of heating and a third refrigerant expansion member, and a bypass conduit including a controlled valve and connected between a junction between said first check valve and said second refrigerant expansion member of said first conduit, and another junction between said second check valve and said third refrigerant expansion member of said second conduit;
- a cooling conduit for said compressor, said cooling conduit being connected to said another junction; and
- means for controlling said valve in accordance with a temperature of said refrigerant discharged from said compressor and a frequency of alternating current supplied to a driving motor of said compressor.

4. The heat pump type air conditioning apparatus according to claim 1 wherein said first, second and third refrigerant expansion members comprise capillary tubes respectively.

5. The heat pump type air conditioning apparatus according to claim 1 wherein said variable capacity type compressor is driven by an output of a variable frequency inverter.

6. The heat pump type air conditioning apparatus according to claim 3 wherein said valve is controlled by a control circuit inputted with a predetermined temperature of said refrigerant discharged from said compressor and a predetermined frequency of the alternating current supplied to the driving motor of said compressor.

* * * * *